US005637635A

United States Patent [19]

Patel

[11] Patent Number: 5,637,635
[45] Date of Patent: Jun. 10, 1997

[54] WATER DISPERSIBLE THICKENERS COMPRISING HYDROPHILIC POLYMERS COATED WITH PARTICULATE FATTY ACIDS OR THE SALTS THEREOF

[75] Inventor: Bharat B. Patel, Bartlesville, Okla.

[73] Assignee: Phillips Petroleum Company, Bartlesville, Okla.

[21] Appl. No.: 336,609

[22] Filed: Nov. 9, 1994

Related U.S. Application Data

[62] Division of Ser. No. 11,053, Jan. 29, 1993, Pat. No. 5,391,359.

[51] Int. Cl.$^6$ .................... C08K 5/09; C08K 9/10
[52] U.S. Cl. ............ 524/400; 524/322; 524/394; 524/398; 524/399; 523/205; 523/207; 523/210
[58] Field of Search ............ 406/171, 197.1, 406/211, 215, 206; 428/403; 427/180, 212; 524/322, 394, 399, 400, 398; 523/205, 207, 210

[56] References Cited

U.S. PATENT DOCUMENTS

| | | | |
|---|---|---|---|
| 3,321,425 | 5/1967 | Blau et al. | 260/23 |
| 3,471,304 | 10/1969 | Hamdy et al. | 106/171 |
| 3,950,293 | 4/1976 | Sander et al. | 260/29.6 RW |
| 3,960,584 | 6/1976 | Savage | 106/197.1 |
| 3,992,344 | 11/1976 | Sander et al. | 260/29.6 RW |
| 4,218,262 | 8/1980 | Warren | 106/206 |
| 4,454,260 | 6/1984 | Dawans et al. | 106/171 |
| 4,499,214 | 2/1985 | Sortwell | 523/336 |
| 4,525,515 | 6/1985 | Peignier et al. | 524/378 |
| 4,720,303 | 1/1988 | Soldatos | 106/181 |
| 4,726,912 | 2/1988 | Bishop et al. | 252/309 |
| 4,735,659 | 4/1988 | Bishop | 106/193 R |
| 5,003,060 | 3/1991 | Vinot | 536/114 |
| 5,096,490 | 3/1992 | Burdick | 106/171 |

FOREIGN PATENT DOCUMENTS

| | | |
|---|---|---|
| 0187433 | 7/1986 | European Pat. Off. |
| 0374658 | 12/1989 | European Pat. Off. |
| 0565354 | 10/1993 | European Pat. Off. |

OTHER PUBLICATIONS

"Utilization of Fatty Acids in Metallic Soaps and Greases", *Fatty Acids and Their Industrial Applications*, Ch. 8, pp. 209–220, Marcel Dekker, Inc., NY, 1968.
Chem. Abstr., 78, 45335 (1973) Ger. Ofrfen. 2,208,555.
Technical Bulletin (118), Witco Corporation (Aug. 1986).
Kirk Othmer Encyclopedia of Chemical Technology, 3rd Ed., vol. 4 (1978), "Carboxylic Acids", pp. 814–871.
Chemical Technology: An Encyclopedia Treatment, vol. 5 (1972), "Natural Fatty Acids and Higher Derivatives", pp. 219–269.
Database WPI, Week 8201, Derwent Publications Ltd., London, GB; AN 00809E & JP-A-56 155 058 (Daicel Chem Inds Ltd) 1 Dec. 1981.
Chemical Abstracts, vol. 96, No. 14, Apr. 5, 1982, Columbus, Ohio, US; abstract No. 109223h, "Mortar Admixture", p. 320.
Technical Bulletins, Synthetic Products Company (No Date).

*Primary Examiner*—Peter A. Szekely
*Attorney, Agent, or Firm*—Gary L. Haag

[57] ABSTRACT

The present invention provides a water dispersible particulate polymer composition having improved water dispersibility comprising a water soluble particulate polymer which has been contacted with a finely divided particulate dispersant comprised of at least one insoluble or sparingly soluble fatty acid or salt thereof so that the particles of the water soluble particulate polymer have dispersed thereon said finely divided particulate dispersant, a method for making said water soluble particulate polymer composition, and the use thereof in viscosifying water-based fluids.

52 Claims, No Drawings

WATER DISPERSIBLE THICKENERS COMPRISING HYDROPHILIC POLYMERS COATED WITH PARTICULATE FATTY ACIDS OR THE SALTS THEREOF

This application is a divisional of application Ser. No. 08/011,053, filed Jan. 29, 1993, now U.S. Pat. No. 5,391,359.

FIELD OF THE INVENTION

The invention relates to a composition and process for providing water soluble polymers with improved dispersibility in water.

BACKGROUND OF THE INVENTION

Water soluble high molecular weight polymers are conventionally utilized in the form of dilute aqueous solution. Although the polymers as manufactured can be dispersed in water to provide homogeneous solutions, care must be exercised in achieving an initial dispersion of the polymer in water. Unless proper precautions are taken, the polymer is likely to agglomerate upon wetting with water to form partially hydrated agglomerated polymer which is slow to dissolve. Moreover, the agglomerated polymer has a tendency to plug liquid handling equipment. Although complete dissolution of the agglomerated polymer is possible, its achievement may require extended periods of time or special treatments to promote rapid dissolution of the gels. Removal of the agglomerated polymer from solutions is also an alternative but is wasteful of polymer.

Thus a process for readily dispersing such polymers would represent a significant contribution to the art.

SUMMARY OF THE INVENTION

It is thus an object of this invention to provide a novel polymer composition which is more easily dispersed in water-based fluids.

It is a further object of this invention to provide a method of making a novel polymer composition which is more easily dispersed in water-based fluids.

It is a still further object of this invention to provide a method for improving the dispersibility of water soluble particulate polymer upon combining with water-based fluids.

Other aspects and objects of this invention will become apparent hereinafter as the invention is more fully described.

In accordance with the present invention, a water dispersible particulate polymer composition has been discovered having improved water dispersibility comprising a water soluble particulate polymer contacted with a finely divided particulate dispersant comprised of at least one fatty acid or salt thereof which is sparingly soluble or insoluble in water, so that the particles of the water soluble particulate polymer have dispersed thereon said finely divided particulate dispersant.

In accordance with another aspect of this invention, a method for making a water dispersible particulate polymer composition possessing improved dispersibility characteristics has been discovered comprising contacting a water soluble particulate polymer with a finely divided particulate dispersant comprised of at least one fatty acid or salt thereof which is insoluble or sparingly soluble in water in an amount effective to improve the water dispersibility of the water soluble polymer, so that the particles of the water soluble particulate polymer have dispersed thereon the finely divided particulate.

In accordance with still another aspect of this invention, it has been discovered that the process of dispersing water soluble polymer water-based fluids can be improved by using the water dispersible particulate polymer composition described above.

DETAILED DESCRIPTION OF THE INVENTION

Water soluble particulate polymers which are suitable for use in the invention are well known in the art. The water soluble particulate polymer should be in a dry solid state and in general have a particle size with a diameter in the range of 1 to 1,000 microns.

Such water soluble polymers are preferably selected from the group consisting of the cellulose ethers, starches, gums, biopolysaccharides, and synthetic water soluble polymers.

Examples of suitable cellulose ethers are those selected from the group consisting of carboxymethylcellulose, methylcellulose, carboxymethylhydroxyethylcellulose, hydroxypropylmethylcellulose, hydroxypropylcellulose, hydroxyethylcellulose, and the like.

Examples of suitable starches include those selected from the group consisting of carboxymethylstarch, hydroxyethylstarch, and hydroxypropylstarch.

Examples of suitable gums are those selected from the group consisting of arabic, trajacanth, karaya, shatti, locust bean, guar, psyllium seed, quince seed, agar, algin, carrageenin, furcellaran, pectin, gelatin, and latch gum.

The biopolymers useful in this invention are biopolymers produced by a process comprising the microbial transformation of a carbohydrate with a microorganism to obtain a polymeric material which differs from the parent polymeric material in respect of composition, properties and structure. Suitable carbohydrates include sugars such as pentoses or hexoses, for example glucose, sucrose, fructose, maltose, lactose, galactose, and starches, for example soluble starch, corn starch and the like. Crude products having a high carbohydrate concentration can be used. Amoug suitable materials there may be mentioned raw sugar, crude molasses and the like. Microorganisms suitable for effecting the microbial transformation of the carbohydrates may be for example plant pathogenic bacteria such as plant pathogens which produce extrudates on the site of lesions on infected plants. Typical of such microorganisms are the species of the genus Xanthomonas. Thus, for example a heteropolysaccharide biopolymer may be prepared from glucose by the action of *Xanthomonas campestris* (XC polymer). Commercially available xanthan gum biopolymers can be obtained from Kelco Div., Merck & Col, Inc. under the trademark of "Kelzan" and General Mills, Inc. under the trademark "Biopolymer XB23". Other species of Xanthomonas bacteria which are useful in preparing the biopolymers include *Xanthomonas phaseoli, Xanthomonas mulvacearn, Xanthomonas carotae, Xanthomonas translucens, Xanthomonas hederae* and *Xanthomonas papavericoli*. Other biopolymers, so-called synthetic gums, which are useful in this invention include: gum dextran synthesized by the action of the bacterium known as genus Leuconostoc Van Tieghement on sucrose, as described by Bailey et al. in U.S. Pat. No. 2,360,237; phosphorylated mannan synthesized by the action of the yeast *Hansenula holstii* NRRL-Y2448 on glucose as disclosed in U.S. Dept. of Agriculture, Agricultural Research Service, Northern Utilization Research and Development Division, Peoria, Ill., Bulletin CA-N-7, October 1958; gums produced by the action of diphtheriodic bacteria such as *Arthrobacter viscous* NRRL B-1973 and

*Arthrobacter viscous* NRRL B-1797 as disclosed in Cadmus et al. in U.S. Pat. No. 3,228,855; gum produced by the action of *Methylomonas mucosa* as described in Finn et al. in U.S. Pat. No. 3,923,782; gum produced by the action of *Erwinia tahitica* as disclosed in Kang et al. in U.S. Pat. No. 3,933,788; and gum produced by the action of *Azotobacter indicus* variety Myxogenes as disclosed in Kang et al. In U.S. Pat. No. 3,960,832.

Examples of suitable biopolysaccharides include those selected from the group consisting of polysaccharide produced by the action of *Xanthomonas campestris, Xanthomonas phaseoli, Xanthomonas mulvacearn, Xanthomonas carotae, Xanthomonas translucens, Xanthomonas hederae, Xanthomonas papavericoli, Hansenula holstii, Arthorobacter viscous, Methylomonas mucosa, Erwinia tahitica* and *Azotobacter indicus*.

As used in this application, the term synthetic water-soluble polymer refers to those synthesized polymers which are truly water-soluble or which are dispersible in water or other aqueous medium to form a stable colloidal suspension. Examples of suitable synthetic water soluble polymers are homopolymers, copolymers, terpolymers and polymers prepared from more than three monomeric components wherein the synthetic water soluble polymer is prepared from one or more monomers selected from the group consisting of acrylic acid and the alkali salts thereof, methacrylic acid and the alkali salts thereof, acrylamide, methacrylamide, acrylonitrile, N-vinyl-2-pyrrolidone, 2-acrylamido-2-methylpropane sulfonic acid and the alkali salts thereof, polyvinyl alcohol, maleic acid, maleic anhydride and itaconic acid or polymers containing equivalent functional units. More preferred water soluble polymers are those prepared from one or more monomers selected from the group consisting of acrylic acid and the alkali salts thereof, acrylamide, N-vinyl-2-pyrrolidone, and 2-acrylamido-2-methylpropane sulfonic acid and the alkali salts thereof, or polymers containing equivalent functional unfits. Preferred copolymers are those prepared from monomeric components consisting of acrylic acid and acrylamide, acrylic acid and acrylonitrile, acrylic acid and methacrylonitrile, acrylic acid and N-vinyl-2-pyrrolidone, acrylamide and N-vinyl-2-pyrrolidone, acrylamide and sodium 2-acrylamido-2-methylpropane sulfonate, or acrylamide and 2-acrylamido-2-methylpropane sulfonic acid or copolymers containing equivalent functional units as the preceding copolymers. Preferred terpolymers are those prepared from monomeric components consisting of sodium acrylate, acrylamide and sodium 2-acrylamido-2-methylpropane sulfonate; sodium acrylate, N-vinyl-2-pyrrolidone, and sodium 2-acrylamido-2-methylpropane; or acrylamide, N-vinyl-2-pyrrolidone and sodium 2-acrylamido-2-methylpropane or terpolymers containing equivalent functional units. For the purpose of this invention, it is contemplated that methacrylic acid or its alkali salts may be substituted for acrylic acid and methanacrylamide may be substituted for acrylamide as equivalent monomers. Preferred synthetic polymers prepared from more than three monomeric components are those wherein the monomeric components are selected from the group consisting essentially of acrylamide, acrylic acid, N-vinyl-2-pyrrolidone and 2-acrylamido-2-methylpropane or polymers containing equivalent functional units. Procedures for making the preceding polymers from the designated monomeric compositions are readily available to one skilled in the art. The procedures discussed in U.S. Pat. No. 5,080,809, which is herein incorporated by reference in its entirety, and specifically cited.

For the purposes of this invention, the terminology "polymer containing equivalent functional units" is defined to be those polymers which are not prepared from the identified monomeric compositions but which have been chemically modified following polymerization to give a polymer containing the same functional units attached to the polymer backbone. An example is the hydrolysis of some of the amide functional groups in acrylamide polymer to carboxylate functional units thereby resulting in a polymer with the same functional units (i.e., amide and carboxylate) attach to the polymer backbone as exist for copolymers prepared from acrylamide and acrylate salt monomers.

Additionally for the purposes of this invention, polymers containing acidic functional units are viewed as interchangeable and equivalent to the alkali salts thereof (i.e., acrylic acid may be interchanged with potassium acrylate, sodium acrylate or ammonium acrylate salts) wherein the alkali salts are potassium salts, sodium salts and ammonium salts.

The above identified polymers may also contain de minimis amounts of water-insoluble monomers provided the resultant polymer remains water soluble. The use of mixtures of the above identified synthetic water-soluble polymers is also within the scope of this invention.

The finely divided particulate dispersant which is contacted with the water-soluble polymer is generally comprised of at least one fatty acid or salt thereof which is generally hydrophobic in nature, that is sparingly soluble or insoluble in water and exists in particulate form. Fatty acids as us,l herein refers to carboxylic acids containing about 6 to about 24 carbon atoms. These acids may contain different degrees of saturation and include, but are not limited to straight chain alkanoic acids, straight chain alkenic acids, acetylenic fatty acids, polyunsaturated fatty acids and cyclic carboxylic acids. Fatty acids are generally derived from natural fats and oils such as animal tallows and grease, and vegetable, coconut, palm and marine oils.

The finely divided particulate dispersant preferably consists of one or more fatty acids or salts thereof possessing a solubility in water of lens than or about 0.3 g/L at 20° C. and a melting point of about 50° C. or greater. The more preferred fatty acids and salts thereof are comprised of alkanoic acids and the Group IA, Group IIA, Group IIB, Group IIIA, Group VIIB and the Transition Metal salts thereof which meet the preceding solubility and melting point criteria and contain at least 10 carbon atoms. For these fatty acid salts, salts possessing a cation selected from the group consisting of sodium, magnesium, calcium, barium, zinc, cadmium, nickel, manganese, copper, and aluminum are preferred. Stearic acid and the associated salts thereof are still more preferred. Preferred stearic acid salts are those possessing a cation selected from the group consisting of sodium, magnesium, calcium, zinc, nickel, manganese, copper, and aluminum. More preferred stearic acid salts are selected from the group consisting of sodium stearate, calcium stearate and magnesium stearate. Although the preformance characteristics for sodium stearate were not as good as some of the other stearate salts, the sodium cation may be preferred in certain systems over the heavier cations which among other things, may complex with other species. For the practice of this invention, the most preferred fatty acid is stearic acid and the most preferred fatty acid salt is calcium stearate. Because of cost, commercial availability and performance characteristics, the most preferred particulate dispersant is calcium stearate.

The finely divided particulates should have a particulate size ranging from about 0.0001 microns to about 250 microns and most preferably range from 0.0001 microns to 150 microns. Suitable techniques for making the finely divided particulate dispersants are known to those skilled in the art. The uncompacted bulk density of the finely divided particulate dispersant should range from about 0.10 g/mL to about 0.60 g/mL and preferably range from 0.20 g/mL to 0.40 g/mL. The bulk density was determined by sifting the material into a 10 mL graduated cylinder (without shaking). The cylinder was then gently shaken for about 5 seconds to level the surface of the material. The total volume and the total weight of the material in the cylinder was determined and the uncompacted bulk density was calculated by the following formula:

$$\text{Uncompacted bulk density} = \frac{\text{Weight}}{\text{Volume}}.$$

The water soluble particulate polymer and the finely divided particulate dispersant should be blended together in a manner which facilitates the thorough mixing of water soluble polymer particles with the finely divided particulate, preferably a substantially homogeneous mixture of the particulate components will be formed. Theoretically, the thorough mixing of these two particulate components is thought to distribute the finely divided particulate dispersant over the surface of the larger water soluble polymer particles, although the present invention, not limited to this theory. Currently, it is preferred to dry blend the water soluble polymer with the finely divided polymer by dry mixing in as blender.

The amount of finely divided particulate dispersant in the final dry composition comprising dispersant and water-soluble polymer should be an amount effective to improve the dispersibility of the water soluble polymer upon combining with a water-based fluid. Preferably, the dispersant in the final composition should be in the range of from about 0.1 weight percent to about 30 weight percent, more preferably in the range of from 1 weight percent to 30 weight percent, and still more preferably about 2 weight percent to about 20 weight percent, based on the total weight percentage of the water soluble particulate polymer and finely divided particulate dispersant totaling 100 weight percent.

The dispersing of the water dispersible particulate polymer composition into a water-based fluid can be conducted using any of the means available to one skilled in the art; the inventive feature of this process resides in the improvement in rate and ease of dispersion when the water soluble polymer is first made part of the water dispersible particulate polymer composition herein described.

The following nonlimiting examples are provided to further illustrate this invention.

EXAMPLE I

A quantitative demonstration of the enhanced water solubilization characteristics of particulate carboxymethylcellulose contacted with either finely divided aluminum stearate or magnesium stearate dispersant over uncontacted carboxymethylcellulose is presented in Table I. Dispersant particle size distribution data is presented in Table II for several candidate dispersants. Uncompacted bulk densities for these candidates are presented in the footnotes to Table II. Blends of carboxymethylcellulose and the finely divided dispersants were prepared by combining in small vials 9.8 g polymer with 0.2 g dispersant and shaking the mixture by hand for approximately two minutes (i.e., until the particles were homogeneously distributed).

The tests were conducted by respectively dumping 0.64 g samples of uncoated carboxymethylcellulose (sample A), a 2/98 wt/wt blend of aluminum stearate/carboxymethylcellulose (inventive sample B), and a 2/98 wt/wt blend of magnesium stearate/carboxymethylcellulose (inventive sample C) into separate Kerr pint jars containing 280 ml tap water whereupon each mixture was immediately stirred with a multimixer for one minute and then immediately transferred to a Fann VG viscometer (Model 35A) for viscosity measurements as a function of time. By definition, the apparent viscosity in centipoise is 50% of the reported measurement value. The results are presented in Table I. All tests were conducted at room temperature.

TABLE I

Effects of Particulate Dispersants on the Solubilization of Carboxymethylcellulose[a]

| Elapsed Time After Mixing (Min.) | Particulate Dispersant | | |
|---|---|---|---|
| | None[b] | Al Stearate[c] | Mg Stearate[d] |
| 1 | 5 cp | 25 cp | 15 cp |
| 3 | 5 | 27 | 17 |
| 5 | 7 | 30 | 20 |
| 7 | 7 | 30 | 21 |
| 10 | 8 | 30 | 22 |
| 15 | 9 | 30 | 24 |
| 20 | 10 | 30 | 25 |
| 25 | 10 | 30 | 26 |
| 30 | 10 | 30 | 27 |
| 40 | 12 | 30 | 27 |
| 50 | 13 | 30 | 27 |
| 60 | 14 | 30 | 27 |
| 70 | 16 | 29 | 27 |

[a]Test conducted by dumping 0.64 g of sample into 280 mL tap water, mixing in multimixer for 1 min, and immediately transferring to Fann VG viscometer (Model 35A) for viscosity measurement at 600 rpm.
[b]Sample A - 100% carboxymethylcellulose. Carboxymethylcellulose - Drispac, Drilling Specialties Company.
[c]Sample B - 2/98 wt/wt aluminum stearate/carboxymethylcellulose. Aluminium stearate - Technical Grade, Fisher Scientific Company
[d]Sample C - 2/98 wt/wt Magnesium Stearate/carboxymethylcellulose. Magnesium stearate - Magnesium Stearate 90, Synthetic Products Company.

The results presented in Table I demonstrate the beneficial effects on tile solubilization of a water-soluble polymer when a properly selected particulate dispersant is intermixed with the polymer. The viscosity or the sample which contained no dispersant (Sample A) gradually increased from a one minute value of 5 to a value of only 16 after more than an hour. In contrast, the sample containing aluminum stearate as a dispersant (inventive sample B) had a one minute value of 25 and quickly plateaued at a value of 30 after only 5 minutes thereby indicating rapid solubilization of tho water soluble polymer. The sample containing magnesium stearate as a dispersant (inventive sample C) had a one minute value of 15 which was five times greater than the corresponding value for sample A and plateaued at an apparent maximum of 27 after only 30 minutes indicating rapid solubilization of the water soluble polymer.

TABLE II

Particle Size Distribution Using Ro-Tap Sieve Shaker (Five Minute Shake Time)

| Dispersant | Tyler Mesh Sizes | | | |
|---|---|---|---|---|
| | +100 | −100 to +200 | −200 to +325 | −325 |
| Aluminum Stearate[a] | 5.8 wt % | 80.7 wt % | 11.9 wt % | 1.6 wt % |
| Magnesium Stearate[b] | 2.7 | 86.8 | 9.8 | 0.7 |
| Stearic Acid (ground)[c] | 60.3 | 25.2 | 14.3 | 0.2 |
| Magnesium | 1.5 | 81.2 | 10.6 | 6.7 |

TABLE II-continued

Particle Size Distribution Using Ro-Tap Sieve Shaker
(Five Minute Shake Time)

| Dispersant | Tyler Mesh Sizes | | | |
|---|---|---|---|---|
| | +100 | −100 to +200 | −200 to +325 | −325 |
| Oxide[d] Calcium Stearate[e] | 2.8 | 70.1 | 24.2 | 2.9 |

[a]Technical grade, Fisher Scientific Co. Bulk density of 0.244 g/mL.
[b]Magnesium Stearate 90, Synthetic Products Company, Cleveland, Ohio. Bulk density of 0.246 g/mL.
[c]Rubber grade stearic acid, PETRAC 250, Synthetic Products Company, Cleveland, Ohio. Sample was ground prior to measurement using an Osterizer blender. Bulk density of ground sample of 0.453 g/mL.
[d]Light burned technical grade magnesium oxide, MagChem 40, Martin Marietta, Hunt Valley, MD. Bulk density of 0.456 g/mL.
[e]Calcium Stearate, Regular, Witco Corp. Bulk density of 0.246 g/mL.

EXAMPLE II

Qualitative steadies of prospective particulate dispersants were conducted by combining the candidate dispersants with a water soluble polymer (carboxymethylcellulose) using the procedure given in Example I. Test solutions were then prepared by dumping 0.64 g of the sample of interest into a Kerr pint jar containing 280 mL of tap water. Particle size distribution for several of the dispersants has been previously presented in Table II. Upon dumping the sample into the Kerr pint jar, the solution was immediately stirred for one minute in a multimixer whereupon observations of sample dispersibility were made and are reported in Table III. All tests were conducted at room temperature.

TABLE III

Qualitative Performance of Candidate Water-Soluble Particulate Dispersing Agents

| Dispersant[a] | Observation |
|---|---|
| None | Large polymer clumps |
| Calcium Stearate[b] | Mostly dispersed, some small clumps |
| Aluminum Stearate[c] | Mostly dispersed, some small clumps |
| Magnesium Stearate[d] | Mostly dispersed, some small clumps |
| Sodium Stearate[c] | Small clumps, few medium large clumps |
| Stearic Acid[c,e] | Some small clumps, one larger clump |
| Hydrophobic Fumed Silica[f] | Mostly dispersed, some small clumps |
| Hydrophobic Fumed Silica[g] | Mostly dispersed, some small clumps |
| Fumed Silica[h] | Large polymer clumps |
| Magnesium Oxide[i] | Large polymer clumps |
| Kaolin[j] | Large polymer clumps |
| Talc[k] | Large polymer clumps |

[a]Weight ratio of dispersant to carboxymethylcellulose water soluble polymer is 2:98. Carboxymethylcellulose - Drispac, Drilling Specialties Co.
[b]Calcium Stearate, Regular, Witco Corp.
[c]Technical Grade, Fisher Scientific Company.
[d]Magnesium Stearate 90, Synthetic Products Company.
[e]Sample was additionally ground using an Osterizer blender (see Table II).
[f]Wacker HDK H15, Wacker-Chemie GmbH.
[g]Cab-O-Sil Grade TS-720, Cabot Corp.
[h]Cab-O-Sil Grade M-5, Cabot Corp.
[i]MagChem 40, Martin Marietta.
[j]Kaolin, Milwhite Co., Houston, TX. Bulk density of 0.615 g/mL
[k]Talc, USP Grade, Mallinckrodt.

The results presented in Table III show that candidate particulate dispersants calcium stearate, aluminum stearate, magnesium stearate, sodium stearate and stearic acid significantly outperform candidate dispersants magnesium oxide, fumed silica, kaolin and talc for dispersing the water-soluble polymer carboxymethylcellulose in water. The calcium, aluminum, and magnesium stearates exhibited performance characteristics equivalent to the more expensive hydrophobic fumed silicas.

EXAMPLE III

This example supplements in a quantitative manner the qualitative results presented in Example II. The test samples and solutions were prepared in an analogous manner (i.e., addition of 0.64 g of sample to 280 ml tap water and then stirred for 1 minute with a multimixer). The solutions were then immediately transferred to a Farm VG viscometer (Model 35A). At the reported times, the viscometer was turned on and viscosity measurements at 600 rpm were obtained. By definition, the measurement readings obtained at 600 rpm and presented in Table IV correspond to the apparent viscosity in centipoise when divided by two. All tests were conducted at room temperature.

TABLE IV

Quantitative Performance Characteristics of Candidate Particulate Dispersants for Water-Soluble Polymers

| Dispersant[a] | 600 rpm Reading | |
|---|---|---|
| | After Five Minutes | After One Hour |
| No Dispersant | 7 (7) cp | 9 (14) cp |
| Calcium Stearate | 24 (25) | 29 (29) |
| Aluminum Stearate[c] | 29 (28) | 30 (28) |
| Magnesium Stearate[d] | 24 (28) | 27 (28) |
| Sodium Stearate[c] | 19 | 24 |
| Stearic Acid[c,e] | 25 (16) | 29 (20) |
| Hydrophobic Fumed Silica[f] | 25 | 29 |
| Hydrophobic Fumed Silica[g] | 25 | 29 |
| Fumed Silica[h] | 4 (10) | 5 (12) |
| Magnesium Oxide[i] | 8 (7) | 10 (9) |
| Kaolin[j] | 10 | 11 |

[a]Weight ratio of dispersant to carboxymethylcellulose* water soluble polymer is 2:98. Values in parenthesis are repeated measurements for a given sample. *Drispac, Drilling Specialties Co.
[b]Calcium Stearate, Regular, Witco Corp.
[c]Technical Grade, Fisher Scientific Company.
[d]Magnesium Stearate 90, Synthetic Products Company.
[e]Sample was additionally ground using an Osterizer blender (see Table II).
[f]Wacker HDK H15, Wacker-Chemie GmbH.
[g]Cab-O-Sil Grade TS-720, Cabot Corp.
[h]Cab-O-Sil Grade M-5, Cabot Corp.
[i]MagChem 40, Martin Marietta.
[j]Kaolin, Milwhite Co., Houston, TX. Bulk density of 0.615 g/mL.

The results presented in Table IV clearly establish calcium, aluminum and magnesium stearates to be equivalent in performance to the hydrophobic fumed silicas and markedly superior to the other candidate dispersants. For the aluminum, calcium and magnesium stearate dispersants, the viscosity reading at 5 min. was 82 to 100% of the one hour reading. This is indicative of excellent dispersing characteristics. The results also indicate sodium stearate and stearic acid to be superior to fumed silica, magnesium oxide and kaolin. The stearic acid did not perform in all tests as well as aluminum, calcium or magnesium stearate. However, the stearic acid particles were of larger particle size and improvement in performance is likely possible by using smaller sized particles. The preparation of such particles is readily within the capabilities of one skilled in the art. Additionally, the use of stearic acid at greater weight ratios as a means of increasing the dispersibility of water-soluble polymers may be economically favored under certain situations.

That which is claimed is:

1. A water dispersible particulate composition comprising (1) a synthetic water soluble particulate polymer prepared from one or more monomers selected from the group consisting of acrylic acid and the alkali salts thereof, methacrylic acid and the alkali salts thereof, acrylamide, methacrylamide, acrylonitrile, N-vinyl-2-pyrrolidone, 2-acrylamido-2-methylpropane sulfonic acid and the alkali salts thereof, vinyl alcohol, maleic acid, maleic anhydride and itaconic acid and (2) a finely divided particulate dispersant wherein said dispersant is comprised of at least one water insoluble or sparingly soluble fatty acid or fatty acid salt thereof and wherein at least of portion of said dispersant is distributed on the surface of said particulate polymer.

2. A water dispersible particulate composition comprising (1) a synthetic water soluble particulate polymer wherein said synthetic water soluble particulate polymer is prepared from a first polymer prepared from one or more monomers selected from the group consisting of acrylic acid and the alkali salts thereof, methacrylic acid and the alkali salts thereof, acrylamide, methacrylamide, acrylonitrile, N-vinyl-2-pyrrolidone, 2-acrylamido-2-methylpropane sulfonic acid and the alkali salts thereof, vinyl alcohol, maleic acid, maleic anhydride and itaconic acid wherein at least one of said monomers is acrylamide or methacrylamide and wherein said first polymer has undergone hydrolysis, whereby at least a portion of the amide functional groups have been convened to carboxyl groups, and (2) a finely divided particulate dispersant wherein said dispersant is comprised of at least one water insoluble or sparingly soluble fatty acid or fatty acid salt thereof and wherein at least of portion of said dispersant is distributed on the surface of said particulate polymer.

3. A composition according to claim 1, wherein said synthetic water soluble particulate polymer is prepared from one or more monomers selected from the group consisting of acrylic acid and the alkali salt thereof, acrylamide, N-vinyl-2-pyrrolidone, and 2-acrylamido-2-methylpropane sulfonic acid and the alkali salts thereof.

4. A composition according to claim 1 wherein said fatty acid or salt thereof is present in the range of from about 0.1 wt % to about 30 wt % based on the combined weight of the water-soluble particulate polymer and the finely divided particulate dispersant and the fatty acid or salt thereof possesses a solubility in water of less than or about 0.3 g/L at 20° C. and a melting point of about 50° C. or greater.

5. A composition according to claim 4 wherein said fatty acid is comprised of an alkanoic acid containing at least 10 carbon atoms and said salts thereof are the Group IA, Group IIA, Group IIB, Group IIIA, Group VIIB and the Transition Metal salts of an alkanoic acid containing at least 10 carbon atoms.

6. A composition according to claim 4 wherein said fatty acid is stearic acid and said salts thereof contain a cation selected from the group consisting of sodium, magnesium, calcium, zinc, nickel, manganese, copper, and aluminum.

7. A composition according to claim 6 wherein said cation is selected from the group consisting of sodium, calcium and magnesium.

8. A composition according to claim 1 wherein said fatty acid is stearic acid and said fatty acid salt thereof is calcium stearate.

9. A composition according to claim 1 where said finely divided particulate dispersant is comprised of calcium stearate.

10. A method for improving the water dispersibility of water soluble particulate polymer which comprises contacting (1) a synthetic water soluble particulate polymer prepared from one or more monomers selected from the group consisting of acrylic acid and the alkali salts thereof, methacrylic acid and the alkali salts thereof, acrylamide, methacrylamide, acrylonitrile, N-vinyl-2-pyrrolidone, 2-acrylamido-2-methylpropane sulfonic acid and the alkali salts thereof, vinyl alcohol, maleic acid, maleic anhydride and itaconic acid with (2) a finely divided particulate dispersant comprised of at least one water insoluble or sparingly soluble fatty acid or fatty acid salt thereof in an amount effective to improve the dispersibility of said water soluble particulate polymer, so that the surface of said particles of said water soluble particulate polymer has dispersed thereon said finely divided particulate dispersant.

11. A method for improving the water dispersibility of water soluble particulate polymer which comprises contacting (1) a synthetic water soluble particulate polymer wherein said synthetic water soluble particulate polymer is prepared from a first polymer prepared from one or more monomers selected from the group consisting of acrylic acid and the alkali salts thereof, methacrylic acid and the alkali salts thereof, acrylamide, methacrylamide, acrylonitrile, N-vinyl-2-pyrrolidone, 2-acrylamido-2-methylpropane sulfonic acid and the alkali salts thereof, vinyl alcohol, maleic acid, maleic anhydride and itaconic acid wherein at least one of said monomers is acrylamide or methacrylamide and wherein said first polymer has undergone hydrolysis, whereby at least a portion of the amide functional groups have been converted to carboxyl groups, with (2) a finely divided particulate dispersant comprised of at least one water insoluble or sparingly soluble fatty acid or fatty acid salt thereof in an amount effective to improve the dispersibility of said water soluble particulate polymer, so that the surface of said particles of said water soluble particulate polymer has dispersed thereon said finely divided particulate dispersant.

12. A method according to claim 10, wherein said synthetic water soluble particulate polymer is prepared from one or more monomers selected from the group consisting of acrylic acid and the alkali salt thereof, acrylamide, N-vinyl-2-pyrrolidone, and 2-acrylamido-2-methylpropane sulfonic acid and the alkali salts thereof.

13. A method according to claim 10 wherein said fatty acid or salt thereof is present in the range from about 0.1 wt % to about 30 wt % based on the combined weight of the water-soluble particulate polymer and the finely divided particulate dispersant and the fatty acid or salt thereof possesses a solubility in water of less than or about 0.3 g/L at 20° C. and a melting point of about 50° C. or greater.

14. A method according to claim 13 wherein said fatty acid is comprised of an alkanoic acid containing at least 10 carbon atoms and said salts thereof are the Group IA, Group IIA, Group IIB, Group IIIA, Group VIIB and the Transition Metal salts of an alkanoic acid containing at least 10 carbon atoms.

15. A method according to claim 13 wherein said fatty acid is stearic acid and said salts thereof contain a cation selected from the group consisting of sodium, magnesium, calcium, zinc, nickel, manganese, copper, and aluminum.

16. A method according to claim 15 wherein said cation is selected from the group consisting of sodium, calcium and magnesium.

17. A method according to claim 10 wherein said fatty acid is stearic acid and said fatty acid salt thereof is calcium stearate.

18. A method according to claim 10 wherein said finely divided particulate dispersant is comprised of calcium stearate.

19. In the process of dispersing water soluble particulate polymer in a water-based fluid, the improvement comprising contacting the water-based fluid with the water dispersible particulate composition of claim 1 wherein is contained the water-soluble particulate polymer.

20. In the process of dispersing water soluble particulate polymer in a water-based fluid, the improvement comprising contacting the water-based fluid with the water dispersible particulate composition of claim 4 wherein is contained the water-soluble particulate polymer.

21. In the process of dispersing water soluble particulate polymer in a water-based fluid, the improvement comprising contacting the water-based fluid with the water dispersible particulate composition of claim 6 wherein is contained the water-soluble particulate polymer.

22. In the process of dispersing water soluble particulate polymer in a water-based fluid, the improvement comprising contacting the water-based fluid with the water dispersible particulate composition of claim 7 wherein is contained the water-soluble particulate polymer.

23. A water dispersible polymeric composition comprising a synthetic water soluble particulate polymer prepared from one or more monomers selected from the group consisting of acrylic acid and the alkali salts thereof, acrylamide, N-vinyl-2-pyrrolidone and 2-acrylamido-2-methylpropane sulfonic acid and the alkali salts thereof and at least one finely divided particulate dispersant selected from the group consisting of stearic acid and the sodium, magnesium, calcium, zinc, nickel, manganese, copper and aluminum salts thereof which is dispersed as particles on the surface of said water soluble particulate polymer in an amount effective to improve the dispersibility of said water soluble particulate polymer.

24. A composition according to claim 23 wherein said finely divided particulate dispersant is calcium stearate.

25. A method for improving the water dispersibility of synthetic water soluble particulate polymers comprising contacting a water soluble polymer prepared from one or more monomers selected from the group consisting of acrylic acid and the alkali salts thereof, acrylamide, N-vinyl-2-pyrrolidone and 2-acrylamido-2-methylpropane sulfonic acid and the alkali salts thereof with at least one finely divided particulate dispersant selected from the group consisting of stearic acid and the sodium, magnesium, calcium, zinc, nickel, manganese, copper and aluminum salts thereof which is dispersed as particles on the surface of said water soluble particulate polymer in an amount effective to improve the dispersibility of said water soluble particulate polymer.

26. A method according to claim 25 wherein said finely divided particulate dispersant is calcium stearate.

27. In the process of dispersing water soluble particulate polymer in a water-based fluid, the improvement comprising contacting the water-based fluid with the water dispersible particulate composition of claim 23 wherein is contained the water-soluble particulate polymer.

28. In the process of dispersing water soluble particulate polymer in a water-based fluid, the improvement comprising contacting the water-based fluid with the water dispersible particulate composition of claim 24 wherein is contained the water-soluble particulate polymer.

29. A composition according to claim 2, wherein said synthetic water soluble particulate polymer is prepared from one or more monomers selected from the group consisting of acrylic acid and the alkali salt thereof, acrylamide, N-vinyl-2-pyrrolidone, and 2-acrylamido-2-methylpropane sulfonic acid and the alkali salts thereof.

30. A composition according to claim 2 wherein said fatty acid or salt thereof is present in the range of from about 0.1 wt % to about 30 wt % based on the combined weight of the water-soluble particulate polymer and the finely divided particulate dispersant and the fatty acid or salt thereof possesses a solubility in water of less than or about 0.3 g/L at 20° C. and a melting point of about 50° C. or greater.

31. A composition according to claim 30 wherein said fatty acid is comprised of an alkanoic acid containing at least 10 carbon atoms and said salts thereof are the Group IA, Group IIA, Group IIB, Group IIIA, Group VIIB and the Transition Metal salts of an alkanoic acid containing at least 10 carbon atoms.

32. A composition according to claim 30 wherein said fatty acid is stearic acid and said salts thereof contain a cation selected from the group consisting of sodium, magnesium, calcium, zinc, nickel, manganese, copper, and aluminum.

33. A composition according to claim 32 wherein said cation is selected from the group consisting of sodium, calcium and magnesium.

34. A composition according to claim 2 wherein said fatty acid is stearic acid and said fatty acid salt thereof is calcium stearate.

35. A composition according to claim 2 where said finely divided particulate dispersant is comprised of calcium stearate.

36. A method according to claim 11, wherein said synthetic water soluble particulate polymer is prepared from one or more monomers selected from the group consisting of acrylic acid and the alkali salts thereof, acrylamide, N-vinyl-2-pyrrolidone, and 2-acrylamido-2-methylpropane sulfonic acid and the alkali salts thereof.

37. A method according to claim 11 wherein said fatty acid or salt thereof is present in the range from about 0.1 wt % to about 30 wt % based on the combined weight of the water-soluble particulate polymer and the finely divided particulate dispersant and the fatty acid or salt thereof possesses a solubility in water of less than or about 0.3 g/L at 20° C. and a melting point of about 50° C. or greater.

38. A method according to claim 37 wherein said fatty acid is comprised of an alkanoic acid containing at least 10 carbon atoms and said salts thereof are the Group IA, Group IIA, Group IIB, Group IIIA, Group VIIB and the Transition Metal salts of an alkanoic acid containing at least 10 carbon atoms.

39. A method according to claim 37 wherein said fatty acid is stearic acid and said salts thereof contain a cation selected from the group consisting of sodium, magnesium, calcium, zinc, nickel, manganese, copper, and aluminum.

40. A method according to claim 39 wherein said cation is selected from the group consisting of sodium, calcium and magnesium.

41. A method according to claim 11 wherein said fatty acid is stearic acid and said fatty acid salt thereof is calcium stearate.

42. A method according to claim 11 wherein said finely divided particulate dispersant is comprised of calcium stearate.

43. In the process of dispersing water soluble particulate polymer in a water-based fluid the improvement comprising contacting the water-based fluid with the water dispersible particulate composition of claim 2 wherein is contained the water-soluble particulate polymer.

44. In the process of dispersing water soluble particulate polymer in a water-based fluid, the improvement comprising contacting the water-based fluid with the water dispersible particulate composition of claim 30 wherein is contained the water-soluble particulate polymer.

45. In the process of dispersing water soluble particulate polymer in a water-based fluid, the improvement comprising contacting the water-based fluid with the water dispersible particulate composition of claim 32 wherein is contained the water-soluble particulate polymer.

46. In the process of dispersing water soluble particulate polymer in a water-based fluid, the improvement comprising contacting the water-based fluid with the water dispersible particulate composition of claim 35 wherein is contained the water-soluble particulate polymer.

47. A water dispersible polymeric composition comprising (1) a synthetic water soluble particulate polymer, wherein said synthetic water soluble particulate polymer is prepared from a first polymer prepared from one or more monomers selected from the group consisting of acrylic acid and the alkali salts thereof, acrylamide, N-vinyl-2-pyrrolidone and 2-acrylamido-2-methylpropane sulfonic acid and the alkali salts thereof wherein at least one of said monomers is acrylamide or methacrylamide and wherein said first polymer has undergone hydrolysis, whereby at least a portion of the amide functional groups have been converted to carboxyl groups, and (2) at least one finely divided particulate dispersant selected from the group consisting of stearic acid and the sodium, magnesium, calcium, zinc, nickel, manganese, copper and aluminum salts thereof which is dispersed as particles on the surface of said water soluble particulate polymer in an amount effective to improve the dispersibility of said water soluble particulate polymer.

48. A composition according to claim 47 wherein said finely divided particulate dispersant is calcium stearate.

49. A method for improving the water dispersibility of synthetic water soluble particulate polymers comprising contacting (1) a synthetic water soluble particulate polymer, wherein said synthetic water soluble particulate polymer is prepared from a first polymer prepared from prepared from one or more monomers selected from the group consisting of acrylic acid and the alkali salts thereof, acrylamide, N-vinyl-2-pyrrolidone and 2-acrylamido-2-methylpropane sulfonic acid and the alkali salts thereof wherein at least one of said monomers is acrylamide or methacrylamide and wherein said first polymer has undergone hydrolysis, whereby at least a portion of the amide functional groups have been converted to carboxyl groups, with (2) at least one finely divided particulate dispersant selected from the group consisting of stearic acid and the sodium, magnesium, calcium, zinc, nickel, manganese, copper and aluminum salts thereof which is dispersed as particles on the surface of said water soluble particulate polymer in an amount effective to improve the dispersibility of said water soluble particulate polymer.

50. A method according to claim 49 wherein said finely divided particulate dispersant is calcium stearate.

51. In the process of dispersing water soluble particulate polymer in a water-based fluid, the improvement comprising contacting the water-based fluid with the water dispersible particulate composition of claim 47 wherein is contained the water-soluble particulate polymer.

52. In the process of dispersing water soluble particulate polymer in a water-based fluid, the improvement comprising contacting the water-based fluid with the water dispersible particulate composition of claim 48 wherein is contained the water-soluble particulate polymer.

* * * * *